US011104822B2

(12) United States Patent
McCanna et al.

(10) Patent No.: US 11,104,822 B2
(45) Date of Patent: Aug. 31, 2021

(54) PROCESSES FOR IN-MOLD COATING SYSTEMS FOR MOLDING, AND PRODUCTS FORMED THEREFROM

(71) Applicant: Covestro LLC, Pittsburgh, PA (US)

(72) Inventors: Jessee McCanna, Midland, PA (US);
Kurt E. Best, Wexford, PA (US);
Robert Wade, Oakdale, PA (US);
Timothy Bish, McKees Rocks, PA (US)

(73) Assignee: Covestro LLC, Pittsburgh, PA (US)

( * ) Notice: Subject to any disclaimer, the term of this patent is extended or adjusted under 35 U.S.C. 154(b) by 386 days.

(21) Appl. No.: 15/955,994

(22) Filed: Apr. 18, 2018

(65) Prior Publication Data

US 2019/0322894 A1 Oct. 24, 2019

(51) Int. Cl.
*B29C 45/14* (2006.01)
*C09D 175/04* (2006.01)
*B29C 45/27* (2006.01)
*B29C 37/00* (2006.01)
*B29C 67/24* (2006.01)
*B29K 75/00* (2006.01)
*B29C 33/62* (2006.01)

(52) U.S. Cl.
CPC ........ *C09D 175/04* (2013.01); *B29C 37/0028* (2013.01); *B29C 45/14* (2013.01); *B29C 45/2701* (2013.01); *B29C 67/246* (2013.01); *B29C 33/62* (2013.01); *B29C 2037/0035* (2013.01); *B29K 2075/00* (2013.01)

(58) Field of Classification Search
CPC ... C09D 175/04; B29C 37/0028; B29C 45/14; B29C 45/2701; B29C 67/246
See application file for complete search history.

(56) References Cited

U.S. PATENT DOCUMENTS

| 4,422,996 A | 12/1983 | Navin et al. |
| 5,084,353 A | 1/1992 | Cobbledick et al. |
| 5,736,090 A | 4/1998 | Yamamoto et al. |
| 5,902,855 A | 5/1999 | Sullivan |
| 6,156,257 A | 12/2000 | Tachi et al. |
| 6,180,043 B1 | 1/2001 | Yonemochi et al. |

(Continued)

FOREIGN PATENT DOCUMENTS

| JP | H08309789 A | 11/1996 |
| JP | 2004058564 A | 2/2004 |

*Primary Examiner* — Joseph S Del Sole
*Assistant Examiner* — John Robitaille
(74) *Attorney, Agent, or Firm* — John E. Mrozinski, Jr.; Richard P. Bender (57) ABSTRACT

Disclosed are processes for In-Mold coating of a substrate. The processes include: introducing a curable composition to a mixhead at a first elevated pressure, the curable composition comprising a first polymeric component and a second polymeric component, the introducing of the curable composition to the mixhead comprising mixing the first and second polymeric components by impingement to form an intermediate composition; introducing the intermediate composition to a secondary mixer, the introducing of the intermediate composition to the secondary mixer comprising mixing the intermediate composition to form a coating composition; and introducing the coating composition into a mold containing a substrate to form a curable coating on a surface of the substrate.

17 Claims, 6 Drawing Sheets

(56) References Cited

U.S. PATENT DOCUMENTS

| | | | |
|---|---|---|---|
| 6,544,449 | B1 | 4/2003 | Gardner |
| 6,616,321 | B2 | 9/2003 | Ehrlicher |
| 7,534,103 | B2 | 5/2009 | Weyand et al. |
| 7,790,089 | B2 | 9/2010 | Zöllner et al. |
| 8,202,074 | B2 | 6/2012 | Toda et al. |
| 2002/0160204 | A1 | 10/2002 | Partusch et al. |
| 2003/0125137 | A1* | 7/2003 | Shannon ................ A63B 37/04 473/383 |
| 2003/0197307 | A1 | 10/2003 | Kitamura et al. |
| 2009/0218726 | A1 | 9/2009 | Sieverding et al. |
| 2011/0018165 | A1 | 1/2011 | Toda et al. |

* cited by examiner

PROCESSES FOR IN-MOLD COATING SYSTEMS FOR MOLDING, AND PRODUCTS FORMED THEREFROM

FIELD

The present disclosure relates to processes for In-Mold coating, systems for molding, and products formed therefrom.

BACKGROUND

Two-component polyurethane forming compositions are widely used because of the many advantageous properties they can exhibit. These curable compositions generally comprise a liquid binder component and a liquid hardener/crosslinker component. The liquid binder component may comprise an isocyanate-reactive component, such as a polyol, and the liquid crosslinker component may comprise a polyisocyanate. The addition reaction of the polyisocyanate with the isocyanate-reactive component, which can occur at ambient conditions, produces crosslinked polyurethane networks that form coating films. Polyurethane coatings are used in a wide variety of applications, one of which is often referred to as "In-Mold" coating.

In an In-Mold coating application, a coating film is molded over the surface of a substrate. In an In-Mold coating method that utilizes a multi-cavity metal mold, the molded plastic part is formed in one cavity of the mold and the molded plastic part is introduced into a second cavity of the mold in which the coating film is injected. Such a process can have advantages over a single cavity In-Mold coating process. For example, cycle time is shorter since it is not composed of the sum of the times of the individual process steps and process parameters can be chosen independently for each cavity. However, such a process may have product quality and productivity issues.

SUMMARY

In one aspect, the present disclosure provides a process for In-Mold coating comprising introducing a curable composition to a mixhead at a first elevated pressure, the curable composition comprising a first polymeric component and a second polymeric component. The introducing of the curable composition to the mixhead comprises mixing the first and second polymeric components by impingement to form an intermediate composition. The process further comprises introducing the intermediate composition to a secondary mixer, the introducing of the intermediate composition to the secondary mixer comprising mixing the intermediate composition to form a coating composition. The process further comprises introducing the coating composition into a mold containing a substrate to form a curable coating on a surface of the substrate.

In some aspects, the present disclosure is directed to a process for In-Mold coating comprising introducing a curable composition to a mixhead at a first elevated pressure, the curable composition comprising a first polymeric component and a second polymeric component. The introducing of the curable composition to the mixhead comprises mixing the first and second polymeric components by impingement to form a coating composition. The process further comprises introducing the coating composition to a mold containing a substrate via a dump well to form a curable coating on a surface of the substrate. Responsive to the introducing of the coating composition into the mold, the process comprises limiting a flow of the curable composition, wherein the introducing of the curable composition to the mixhead is decreased to a second pressure less than the first elevated pressure to form a non-homogenous mixture. The process further comprises limiting entry of the non-homogeneous mixture into the mold by a volume of the dump well.

In another aspect, the present disclosure is directed to a process for In-Mold coating comprising introducing a curable composition to a mixhead at a first elevated pressure, the curable composition comprising a first polymeric component and a second polymeric component. The introducing of the curable composition to the mixhead comprises mixing the first and second polymeric components by impingement to form a coating composition. The process further comprises introducing the coating composition into a mold containing a substrate via at least two channels to form a curable coating on a surface of the substrate.

In another aspect, the present disclosure is directed to a system for In-Mold coating. The system comprises a mixhead, a first body, and a secondary mixer. The mixhead is in communication with the first body and the mixhead is configured to receive a curable composition at a first elevated pressure. The curable composition comprises a first polymeric component and a second polymeric component. The mixhead is configured to mix the first and second polymeric components by impingement to form an intermediate composition. The secondary mixer is positioned between the mixhead and a cavity positioned in the first body. The secondary mixer is configured to receive the intermediate composition and to mix the intermediate composition to form a coating composition. A cavity is positioned in the first body. The cavity is configured to receive a substrate and the coating composition, and to form a curable coating on a surface of the substrate from the coating composition.

In another aspect, the present disclosure is directed to a system for In-Mold coating. The system comprises a mixhead, a first body, a secondary mixer, and a dump well. The mixhead is in communication with the first body and the mixhead is configured to receive a curable composition at a first elevated pressure. The curable composition comprises a first polymeric component and a second polymeric component. The mixhead is configured to mix the first and second polymeric components by impingement to form a coating composition. A cavity is positioned in the first body. The cavity is configured to receive a substrate and the coating composition, and to form a curable coating on a surface of the substrate from the coating composition. Responsive to receipt of the coating composition by the cavity, the mixhead is configured to receive the curable composition at a second pressure less than the first elevated pressure to form a non-homogenous mixture. The dump well is positioned between the mixhead and the cavity. The dump well has a volume sized to limit entry of the non-homogenous mixture into the mold.

In another aspect, the present disclosure is directed to a system for In-Mold coating. The system comprises a mixhead, a first body, a secondary mixer, and at least two channels. The mixhead is in communication with the first body and the mixhead is configured to receive a curable composition at a first elevated pressure. The curable composition comprises a first polymeric component and a second polymeric component. The mixhead is configured to mix the first and second polymeric components by impingement to form a coating composition. A cavity is positioned in the first body. The cavity is configured to receive a substrate and the coating composition, and to form a curable coating on a surface of the substrate from the coating composition. The channels are positioned between the mixhead and the cavity, and the channels are configured to facilitate conveyance of the coating composition to the cavity.

In another aspect, the present disclosure is directed to a molded article comprising a first body comprising a substrate and a molded coating. The coating is in contact with a surface of the substrate. The coating comprises a polymeric composition and the coating has a thickness between 50 micrometers and 100 micrometers.

In another aspect, the present disclosure is directed to a product formed by an In-Mold coating process. More specifically, a curable composition is introduced to a mixhead at a first elevated pressure including mixing the first and second polymeric components by impingement to form an intermediate composition. The curable composition comprises a first polymeric component and a second polymeric component. The intermediate composition is introduced to a secondary mixer including mixing the intermediate component to form a coating composition. The coating composition is introduced into a mold containing a substrate to form a curable coating on a surface of the substrate.

In another aspect, the present disclosure is directed to a product formed by an In-Mold coating process. More specifically, a curable composition is introduced to a mixhead at a first elevated pressure including mixing the first and second polymeric components by impingement to form a coating composition. The curable composition comprises a first polymeric component and a second polymeric component. The coating composition is introduced into a mold containing a substrate via a dump well to form a curable coating on a surface of the substrate. Responsive to the introducing of the coating composition into the mold, a flow of the curable composition is limited wherein the introducing of the curable composition to the mixhead is decreased to a second pressure less than the first elevated pressure to form a non-homogenous mixture. Entry of the non-homogenous mixture into the mold is limited by a volume of the dump well.

In another aspect, the present disclosure is directed to a product formed by an In-Mold coating process. More specifically, a curable composition is introduced to a mixhead at a first elevated pressure including mixing the first and second polymeric components by impingement to form a coating composition. The curable composition comprises a first polymeric component and a second polymeric component. The coating composition is introduced into a mold containing a substrate via at least two channels to form a curable coating on a surface of the substrate.

In another aspect, the present disclosure is directed to a product formed by an In-Mold coating process. More specifically, a curable composition is introduced to a mixhead at a first elevated pressure including mixing the first and second polymeric components by impingement to form a coating composition. The curable composition comprises a first polymeric component and a second polymeric component. The coating composition is introduced into a mold containing a substrate via a secondary cavity to form a curable coating on a surface of the substrate. The secondary cavity comprises at least one of a secondary mixer, a dump well, and at least two channels.

It is understood that the invention disclosed and described in this specification is not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Various examples are described and illustrated herein to provide an overall understanding of the structure, function, operation, manufacture, and use of the disclosed products and processes. The various examples described and illustrated herein are non-limiting and non-exhaustive. Thus, the invention is not limited by the description of the various non-limiting and non-exhaustive examples disclosed herein. Rather, the invention is defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated herein by reference in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout the specification to "various aspects," "some aspects," "one aspect," or "an aspect", similar language relating to "examples," and the like, means that a particular feature, structure, or characteristic described in connection with the example is included in at least one aspect. Thus, appearances of the phrases "in various aspects," "in some aspects," "in one aspect", or "in an aspect", similar language relating to "examples," and the like, in places throughout the specification are not necessarily all referring to the same aspect. Furthermore, the particular features, structures, or characteristics may be combined in any suitable manner in one or more aspects. Thus, the particular features, structures, or characteristics illustrated or described in connection with one example or aspect may be combined, in whole or in part, with the features structures, or characteristics of one or more other examples or aspects without limitation. Such modifications and variations are intended to be included within the scope of the present aspects.

In this specification, unless otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

As used herein, "polymer" encompasses prepolymers, oligomers and both homopolymers and copolymers; the prefix "poly" in this context referring to two or more. As used herein, "molecular weight", when used in reference to a polymer, refers to the number average molecular weight ("Me"), unless otherwise specified. As used herein, the $M_n$ of a polymer containing functional groups, such as a polyol, can be calculated from the functional group number, such as hydroxyl number, which is determined by end-group analysis, as is well known to those skilled in the art.

As used herein, the term "aliphatic" refers to organic compounds characterized by substituted or un-substituted straight, branched, and/or cyclic chain arrangements of constituent carbon atoms. Aliphatic compounds do not contain aromatic rings as part of the molecular structure thereof. As used herein, the term "cycloaliphatic" refers to organic compounds characterized by arrangement of carbon atoms in closed ring structures. Cycloaliphatic compounds do not contain aromatic rings as part of the molecular structure thereof. Therefore, cycloaliphatic compounds are a subset of aliphatic compounds. Therefore, the term "aliphatic" encompasses aliphatic compounds and/or cycloaliphatic compounds.

As used herein, "diisocyanate" refers to a compound containing two isocyanate groups. As used herein, "polyisocyanate" refers to a compound containing two or more isocyanate groups. Hence, diisocyanates are a subset of polyisocyanates.

In an In-Mold coating application, a coating film is molded over the surface of a substrate. However, if the coating film is not mixed properly prior to entering the second cavity, product quality and productivity issues may arise. Of course, other important coating properties issues may also arise, such as adhesion of the coating to the substrate, and physical properties, such as scratch resistance, stain resistance, and chemical resistance. As a result, it is desirable to provide a process for In-Mold coating utilizing, for example, a multi-cavity metal mold that can exhibit excellent mixing properties, minimal waste of a curable composition, and has a high quality finish exhibiting good physical properties, such as, adherence to the substrate, scratch resistance, stain resistance, and/or chemical resistance.

In certain aspects, the present disclosure relates to a process for In-Mold coating that can exhibit excellent mixing properties, minimal waste of a curable composition, and has a high quality finish exhibiting good physical properties, such as, adherence to the substrate, scratch resistance, stain resistance, and/or chemical resistance. Such processes comprise introducing a curable composition to a mixhead at a first elevated pressure, the curable composition comprising a first polymeric component and a second polymeric component. The introducing of the curable composition to the mixhead can comprise mixing the first and second polymeric components by impingement to form an intermediate composition. The process may further comprise introducing the intermediate composition to a secondary mixer, the introducing of the intermediate composition to the secondary mixer comprising mixing the intermediate composition to form a coating composition, and introducing the coating composition into a mold containing a substrate to form a curable coating on a surface of the substrate.

In certain aspects, the substrate may be a pre-made part comprising a metal, a plastic, and combinations thereof. In one aspect, the substrate can be a light emitting diode (LED). In certain aspects, the substrate may be a molded plastic substrate. Aspects of the process may be carried out in a mold which has two or more cavities, so that the two process steps of molding and coating of the substrate can take place in different cavities. The surfaces of the cavities may be produced from the same or different materials, such as, e.g., glass, ceramic, plastic, metals or alloys.

The molding of the substrate in the substrate mold cavity may be carried out, for example, by injection molding, injection compression molding, compression molding, reaction injection molding (RIM), and/or foaming. Thermoplastic and thermosetting plastics may be employed as substrate materials, specific examples of which include, but are not limited to, polycarbonate (PC), polyester, such as polybutyleneterephthalate (PBT) or polyethyleneterephthalate (PET), polyamide (PA), polyethylene (PE), polypropylene (PP), polystyrene (PS), poly(acrylonitrile-co-butadiene-co-styrene) (ABS), poly(acrylonitrile-co-styrene-co-acrylicester) (ASA), poly(styrene-acrylonitrile) (SAN), polyoximethylene (POM), cyclic polyolefine (COC), polyphenylenoxide (PPO), polymethylmethacrylat (PMMA), polyphenylensulfide (PPS), polyurethane (PUR), epoxy resins (EP), polyvinylchloride (PVC) and blends thereof. The substrate may be of any desired shape that the equipment can accommodate.

The molding of the substrate in the substrate mold cavity can be carried out by an injection molding process utilizing a thermoplastic. Suitable thermoplastics include, but are not limited to, polycarbonate (PC), polybutylene terephthalate (PBT), polyamide (PA), polyethylene (PE), polypropylene (PP), polystyrene (PS), poly(acrylonitrile-co-butadiene-co-styrene) (ABS), poly(acrylonitrile-co-styrene-co-acrylicester) (ASA), poly(styrene-acrylonitrile) (SAN), polyethyleneterephthalate (PET), polyoximethylene (POM), cyclic polyolefine (COC), polyphenylenoxide/polyamide (PPO/PA) or polyphenylenoxide/polystyrene PPO/PS blends, poly(methyl methacrylate) (PMMA), polyphenylensulfide (PPS), thermoplastic polyurethane (TPU), epoxy resins (EP), polyvinylchloride (PVC) and blends thereof. In certain aspects, the thermoplastic comprises a PC/ABS blend, such as BAYBLEND T85 SG, from Covestro AG.

According to certain aspects, after molding of the substrate, the substrate can be introduced into a second cavity of the same mold by opening the mold and transferring the substrate into a coating mold cavity. The transfer of the substrate may be carried out by any of a variety of methods. Examples of suitable methods include, but are not limited to, transfer with a rotary table, turning plate, sliding cavity and index plate as well as comparable methods in which the substrate remains on the core of a mold. In examples where the substrate remains on the core for the transfer, as a further benefit, the substrate position may also be accurately defined after the transfer. In certain aspects, the substrate is removed from one cavity, e.g., with the aid of a handling system, and laid into another cavity.

According to certain aspects of the present disclosure, a curable composition is introduced into the coating mold cavity containing the substrate in order to coat a surface of the substrate. The curable compositions utilized in certain aspects comprise: (i) a first polymeric component including a polymer comprising isocyanate-reactive group(s); and (ii) a second polymeric component including a polyisocyanate. In certain aspects, the curable composition may be a high solids composition. As used herein, "high solids composition" means that the curable composition comprises no more than 15 percent by weight volatile materials, such as, organic solvents, water, etc., based on the total weight of the curable composition. In certain aspects, the curable comprises not more than 10 percent by weight volatile materials such as, for example, not more than 2 percent by weight of volatile materials or not more than 1 percent by weight of volatile materials. In certain aspects, the curable composition may be a 100 percent solids composition that has a relatively low viscosity. As used herein, "relatively low viscosity" means a viscosity of no more than 12,000 mPa·s at 23° C. when measured according to DIN EN ISO 3219/A3 or 12,000 cps at 72° F. when measured according to ASTM D5125, determined using a rotational viscometer-VISCO TESTER 550, Thermo Haake GmbH and a hydroxyl content of 15.4-16.6 percent (measured according to DIN 53 240/2 or ASTM 7253.

Suitable polymers comprising isocyanate-reactive groups include, for example, polymeric polyols, such as, polyether polyols, polyester polyols, and/or polycarbonate polyols, among others.

Suitable polyether polyols include, for example, those having a $M_n$ of 100 to 4,000 g/mol. Polyether polyols which are formed from recurring ethylene oxide and propylene oxide units are sometimes used, such as those having a content of from 35 to 100 percent of propylene oxide units, such as 50 to 100 percent of propylene oxide units. These can be random copolymers, gradient copolymers or alternating or block copolymers of ethylene oxide and propylene oxide. Suitable polyether polyols derived from recurring propylene oxide and/or ethylene oxide units are commercially available and include, for example, those available from, for example, Covestro AG (such as e.g. DESMOPHEN 3600Z, DESMOPHEN 1900U, ACCLAIM Polyol 2200, ACCLAIM Polyol 40001, ARCOL Polyol 1004, ARCOL Polyol 1010, ARCOL Polyol 1030, ARCOL Polyol 1070, BAYCOLL BD 1110, BAYFILL VPPU 0789, BAYGAL K55, PET1004, POLYETHER S180).

In certain aspects, the polymeric polyol comprises a polyester polyol, such as those having a $M_n$ of 200 to 4,500 g/mol. In certain aspects, the polyester polyol has a viscosity of 700 to 50,000 mPa·s at 23° C. and a hydroxyl number of 200 to 800 mg KOH/g. In certain aspects, the polyester polyol may be based on an aromatic carboxylic polyester with an average hydroxyl functionality of greater than 2, such as 3 or more, and an average hydroxyl number of 350 to 700 mg KOH/g, such as 450 to 600 mg/KOH/g and a viscosity of 1000 to 30000 mPa·s at 23° C. Suitable polyester polyols can be prepared, as will be appreciated, by reacting polyhydric alcohols with stoichiometric amounts of polybasic carboxylic acids, carboxylic anhydrides, lactones or polycarboxylic acid esters of $C_1$-$C_4$ alcohols.

The polyester polyol may be derived from one or more of aromatic polybasic carboxylic acids or their anhydride, ester derivatives, ε-caprolactone, optionally in a mixture with one or more aliphatic or cycloaliphatic polybasic carboxylic acids or their derivatives.

In certain aspects, the polymeric polyol comprises an aliphatic polycarbonate polyol, such as a polycarbonate diol, such as those having a $M_n$ of 200 to 5000 gram/mole, such as 150 to 4,500 gram/mole, 300 to 2000 gram/mole, 300 to 2,500 gram/mole or 400 to 1000 gram/mole, and a hydroxyl functionality of 1.5 to 5, such as 1.7 to 3 or 1.9 to 2.5. Such polycarbonate polyols can, in certain aspects, also have a viscosity of 2000 to 30,000 mPa·s at 23° C., such as 2500 to 16000 mPa·s or 3000 to 5000 mPa·s, when measured according to DIN EN ISO 3219/A3 determined using a rotational viscometer-VISCO TESTER 550, Thermo Haake GmbH, a hydroxyl content of 15.4-16.6 percent (measured according to DIN 53 240/2), and/or a hydroxyl number of 40 to 300 mg KOH/gram, such as 50 to 200 mg KOH/gram or 100 to 200 mg KOH/gram, when measured by end-group analysis as is well understood in the art.

The polymer comprising isocyanate-reactive groups may comprise (i) a polyester polyol, such as a branched polyester polyol, and (ii) a polycarbonate polyol, such as a polycarbonate diol, such as a polycarbonate polyester diol, such as those based on 1,6-hexanediol and ε-caprolactone. In certain aspects, the weight ratio of (i) and (ii) in the curable compositions may be in the range of 1:10 to 10:1, such as 1:5 to 5:1, 1:4 to 4:1, 1:3 to 3:1, 1:2 to 2:1, or, in some cases, it is 1:1. In certain aspects, the polymer comprising isocyanate-reactive groups (or mixture of two or more such polymers as described above) is selected so as to have a relatively low viscosity at 23° C. (measured according to DIN EN ISO 3219/A.3), such as no more than 10,000 mPa·s, or, in some cases, no more than 9,000 mPa·s or no more than 8,000 mPa·s.

In certain examples, the curable compositions may further comprise a polyisocyanate. Suitable polyisocyanates include aromatic, araliphatic, aliphatic or cycloaliphatic di- and/or polyisocyanates and mixtures thereof. In certain aspects, the polyisocyanate may comprise a diisocyanates of the formula wherein R represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms. Specific examples of suitable diisocyanates include, for example, xylylene diisocyanate, tetramethylene diisocyanate, 1,4-diisocyantobutane, 1,12-diisocyanatododecane, hexamethylene diisocyanate, 2,3,3-trimethylhexamethylene diisocyanate, 1,4-cyclohexylene diisocyanate, 4,4'-dicyclohexylmethane diisocyanate, 4,4'-dicyclohexyl diisocyanate, 1-diisocyanato-3,3,5-trimethyl-5-isocyanatomethylcyclohexan-e (isophorone diisocyanate), 1,4-phenylene diisocyanate, 2,6-tolylene diisocyanate, 2,4-tolylene diisocyanate, 1,5-naphthylene diisocyanate, 2,4'- or 4,4'-diphenylmethane diisocyanate, 4,4'-diphenyldimethylmethane diisocyanate, α,α,α',α'-tetramethyl-m- or -p-xylylene diisocyanate, and triphenylmethane 4,4',4"-triisocyanate as well as mixtures thereof. Also suitable are monomeric triisocyanates such as 4-isocyanatomethyl-1,8-octamethylene diisocyanate.

Polyisocyanate adducts containing isocyanurate, iminooxadiazine dione, urethane, biuret, allophanate, uretdione and/or carbodiimide groups are also suitable for use in the curable compositions of the present disclosure. Such polyisocyanates may have isocyanate functionalities of 3 or more and can be prepared, for example, by the trimerization or oligomerization of diisocyanates or by the reaction of diisocyanates with polyfunctional compounds containing hydroxyl or amine groups. The polyisocyanate may be, for example, hexamethylene diisocyanate.

In certain examples, the curable composition may comprise a low viscosity polyisocyanate having a viscosity at 23° C. and at 100 percent solids of less than 2000 mPa·s, such as less than 1500 mPa·s and, in some cases, 800 to 1400 mPa·s, when measured according to DIN EN ISO 3219/A3 determined using a rotational viscometer-VISCO TESTER 550, Thermo Haake GmbH; an isocyanate group content of 8.0 to 27.0 percent by weight, such as 14.0-24.0 percent by weight or 22.5-23.5 percent by weight (according to DIN EN ISO 11909); an NCO calculated functionality of 2.0 to 6.0, such as 2.3 to 5.0 or 2.8 to 3.2; and a content of monomeric diisocyanate of less than 1 percent by weight, such as less than 0.5 percent by weight.

Examples of these polyisocyanates include isocyanurate group-containing polyisocyanates. Cyclic and/or linear polyisocyanate molecules may be employed. For improved weathering and diminished yellowing the polyisocyanate(s) of the isocyanate component may be aliphatic.

In certain aspects, the polyisocyanate comprises, or, in some aspects, may consist essentially of, or may consist of, a polyisocyanate containing biuret groups, such as the biuret adduct of hexamethylene diisocyanate (HDI) available from Covestro AG under the trade designation DESMODUR N-100, a polyisocyanate containing isocyanurate groups, such as that available from Covestro AG under trade designation DESMODUR N-3300, and/or a polyisocyanate containing urethane groups, uretdione groups, carbodiimide groups, allophanate groups, and the like.

The pre-reaction of the polyisocyanate with hydroxy group-containing material may result in the modified polyisocyanate having a higher molecular weight and lower isocyanate content than the polyisocyanate alone. This can often lead to a higher viscosity in the modified polyisocyanate. It is often desirable that the modified polyisocyanate is low in viscosity, such as those in which the Brookfield viscosity is less than about 10,000 cps, such as less than 5,000 cps, or, in some cases, less than 4,000 cps at temperatures ranging from 25° C. to 70° C. Exemplary polyisocyanates include those commercially available from Covestro AG under the tradename DESMODUR N-3600, which has a viscosity of 800-1400 mPa·s at 25° C.

In certain aspects, in forming the curable composition, the polymer(s) comprising isocyanate-reactive groups, such as the polyol(s) mentioned herein and the polyisocyanate(s) may be combined in relative amounts such that the curable composition has a ratio of isocyanate groups to isocyanate-reactive groups of 0.8 to 3.0:1, such as 0.8 to 2.0:1, and, in some aspects, 1 to 1.8:1 or 1 to 1.5:1. In certain aspects, this ratio may be greater than 1.2:1, such as at least 1.3:1 and/or up to 1.4:1.

The curable compositions used may comprise a catalyst for the reaction between the isocyanate-reactive group, such as the hydroxyl group, and the isocyanate group. Suitable catalysts include metallic and nonmetallic catalysts, such as, but are not limited to, amine catalysts, such as 1,8-diazabicyclo[5.4.0]undec-7-ene (DBU), 1,4-diazabicyclo[2.2.2]-octane (DABCO) or triethanolamine, and Lewis acid compounds, such as dibutyltin dilaurate, lead octoate, tin octoate, titanium and zirconium complexes, cadmium compounds, bismuth compounds, such as bismuth neodecanoate and iron compounds. In certain aspects, the catalyst may be present in the curable composition in an amount of no more than 1.0 percent by weight, based on the total solids contents of the curable composition.

In certain examples, the curable compositions may comprise an internal mold release agent, such as silicone, thereby facilitating the release of the cured coating from the coating mold cavity.

When present, the internal mold release agent may be included in the curable composition in an amount of 0.1 to 5 percent by weight, and in certain examples, may be present in an amount of 0.1 to 1.0 percent by weight, based on the total weight of the curable composition. In certain aspects, the internal mold release agent may be present in the curable composition in an amount sufficient to provide a cured coating with a surface tension of no more than 30 dynes/cm, such as no more than 25 dynes/cm, when measured using a Rame-Hart goniometer in which total solid surface energies, including the polar and dispersive components are calculated using the advancing angles according to the Owens Wendt procedure and in which samples are stacked together without surface protection and the surfaces are lightly brushed to remove dust prior to analysis.

The curable compositions may further comprise, for example, any customary auxiliaries and additives of paint technology, such as defoamers, thickeners, pigments, dispersing assistants, catalysts, anti-skinning agents, anti-settling agents, and/or emulsifiers.

In certain aspects, the step of coating the substrate may be carried out under elevated pressure, such as greater than 500 pounds per square inch (psi), in certain examples at least 1000 psi, and in other examples at least 1600 psi. In certain examples the elevated pressure may be between 1500 psi to 3000 psi, and in certain other examples between 1600 psi to 2800 psi. The coating may be applied by injecting the curable composition at elevated pressure into the gap between the surface of the substrate and the inner wall of the coating mold cavity. The pressure may be elevated by any means that provides a suitable level for the coating mold cavity. For example, the coating mold cavity may be pressurized via an external pressure device, such as clamps (as described in more detail below), to be filled before the end of the pot life of the curable composition is reached. The pressure may also aid in preventing the formation of bubbles at a flow front of the curable composition.

Injection of the curable composition into the coating mold cavity can be accomplished via one or more injection points such that the gap between the surface of the substrate and inner wall of the coating mold cavity is filled with the curable composition. For an optimum injection of the curable composition, the position of the injection point can be chosen appropriately in a manner known to the person skilled in the art. In certain aspects, the gap is sized such that following injection into the gap and curing of the curable composition, the dry coating thickness of the cured curable composition is between 50 microns to 200 microns, in certain examples between 50 and 100 microns, and in other examples between 80 and 100 microns.

In certain aspects, the coating mold cavity may be designed to provide a controlled displacement of the air present in the coating mold cavity and removal of the air via a parting line or venting channels during the injection. Known calculation programs may be used to provide the controlled air displacement, such as, for example Moldflow from Autodesk Inc. In certain aspects, the mixture is injected into the coating mold cavity at a flow rate of 2-40 grams/second, a line pressure of 500 to 3000 psi (34-206 bar) and a temperature of 120-200° F. (49-52° C.) depending on viscosity (a higher viscosity mixture requires higher temperature). In certain examples, the mixture is injected into the coating mold cavity at a flow rate of less than 8 grams/second.

The coating may be carried out by the RIM process with a single cavity or with multiple cavities. The RIM process can have an advantage that the components of the curable composition are combined only immediately before injection into the coating mold cavity or cavities. In certain aspects, this is accomplished by feeding a first polymeric component comprising an isocyanate-reactive resin (as described herein) and a second polymeric component comprising a polyisocyanate (as described herein) from a RIM installation into an impingement mixing head, hereinafter referred to as a mixhead, where the polymeric components are mixed before injection into the coating mold cavity. Within the mixhead, the components of the curable composition are impinged together at an elevated pressure to induce mixing. In certain aspects, the elevated pressure is at least 500 psi such as at least 1000 psi, and in other examples at least 1600 psi. For example, the elevated pressure may be between, for example, 1500 psi to 3000 psi, and in other examples between 1600 psi to 2800 psi. Typically, to achieve such pressures, each of the components is fed to the mixhead through a small diameter orifice having a diameter of, for example, 1.0 µm or less.

The components of the curable composition may be mixed by an elevated pressure counter-current mixing head, a static mixer, or an active mixer. In certain aspects, the components of the curable composition may be mixed by at least two of the mixhead, the counter-current mixing head, the static mixer, and the active mixer.

The extent of the mixing may affect the curing properties of the curable composition and/or the properties of the cured coating created from the curable composition. For example, as used herein, a "properly mixed" curable composition has a substantially uniform appearance and composition throughout (e.g., homogeneous), and desired curing properties and cured coating properties. The curing properties may be, for example, gel time, cream time, pot life, working life, viscosity, and temperature. The cured coating properties may be, but are not limited to, adhesion of the coating to the substrate, and physical properties, such as scratch resistance, stain resistance, chemical resistance, and surface finish. As used herein, curing of the curable composition means that the curable composition has cured (e.g., reacted, become set-to-touch, gelled, etc.) to an extent sufficient so that upon opening of the mold, the coated substrate releases, e.g., demolds, from the mold.

As used herein, an "improperly mixed" curable composition (e.g., non-homogeneous) contains at least some inhomogeneities (e.g., non-uniform appearance and/or composition) which affect the curing properties and/or cured coating properties. Thus, the improperly mixed curable composition does not have the desired curing properties and/or cured coating properties. For example, the improperly mixed curable composition may have a first gel time that is longer than a second gel time of the properly mixed curable composition. In certain aspects, the improperly mixed curable composition may have a first viscosity different than a second viscosity of the properly mixed curable composition. In certain aspects, the improperly mixed curable composition may create a coating which has a cosmetic and/or tacky (slightly sticky feel) defect (e.g., surface finish irregularity) requiring re-work or scrapping of the coated substrate.

After exiting the mixhead, the curable composition can enter a channel within the mold (e.g., a runner, a sprue, etc.) which directs the flow of the curable composition from the mixhead to an injection point (e.g., gate) into the coating mold cavity. The filling of the coating mold cavity creates a back pressure due to the resistance of the curable composition entering the coating mold cavity and displacing the air. The back pressure may be affected by a length the curable composition has to travel from the injection point to the furthest point in the mold from the gate and a cross-sectional area along the length. Decreasing the cross-sectional area (e.g., decreasing coating thickness) while maintaining the same travel length creates a higher back pressure as the curable composition is more resistant to flow through the smaller cross-sectional area.

The back pressure may be affected by the viscosity of the curable composition. During a time of travel of the curable composition from the mixhead to filling the coating mold cavity, the curable composition begins to cure. As the curable composition begins to cure into a cured coating on the substrate, the viscosity of the curable composition may increase and thus, the back pressure increases as the coating is more resistant to flow.

The back pressure can cause the pressure and/or velocity of the components of the curable composition to decrease (e.g., for potentially less than a second) within the mixhead. Due to the decrease in pressure and/or velocity, improper mixing of the curable composition may occur within the mixhead and, in certain aspects, the improper mixing creates inhomogeneities within a flow of the curable composition exiting the mixhead. The improperly mixed curable composition may enter the coating mold cavity via the channel and the injection point. Thus, the improperly mixed curable composition can coat the substrate and can cause a cosmetic and/or tacky defect in the cured coating.

Figure 1:
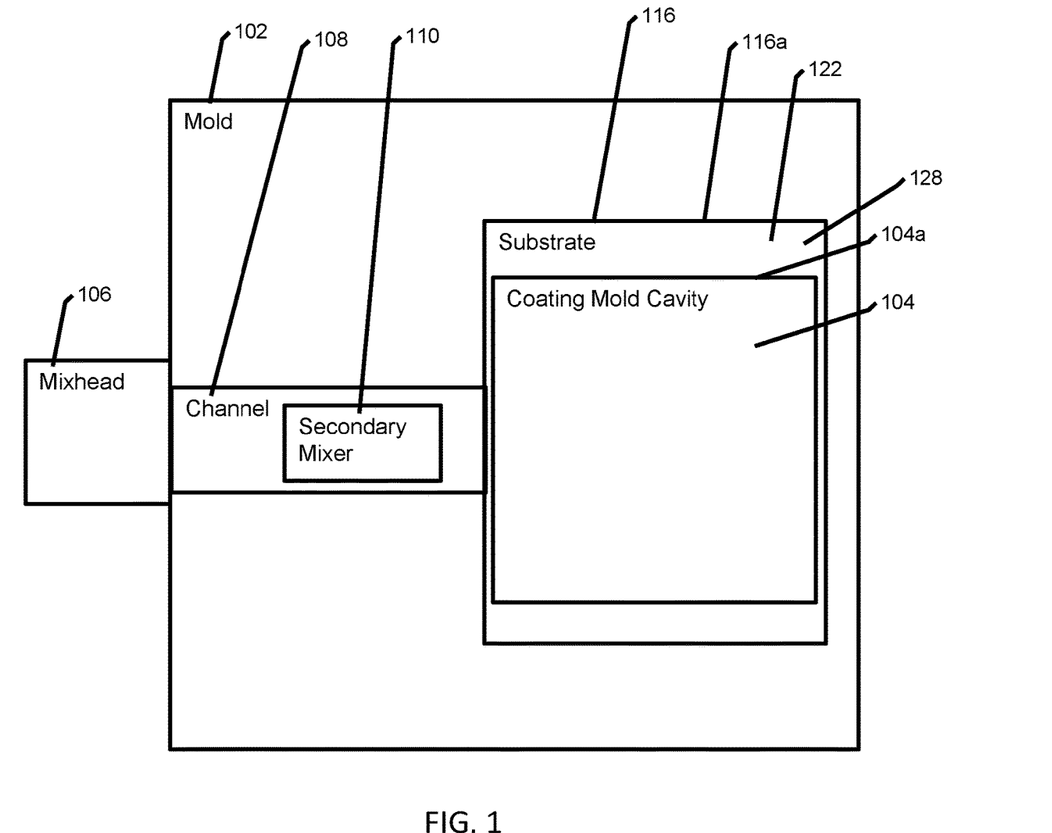
FIG. 1 depicts a mold with a secondary mixer.

FIG. 1 illustrates a mixing system comprising a mold 102 with a secondary mixer 110. As shown, a mixhead 106 is positioned proximal to the mold 102. The mixhead 106 is configured to receive a curable composition which can comprise a first polymeric component and a second polymeric component. In certain aspects, the curable composition can be, for example, polyurethane such as, e.g., a one-component polyurethane or a two-component polyurethane. In certain aspects, the curable composition is a thermosetting plastic. Within the mixhead 106, the first and second polymeric components of the curable composition can be impinged together at an elevated pressure to induce mixing. In certain aspects, the elevated pressure is at least 500 psi, such as, for example, at least 1000 psi or at least 1600 psi. For example, the elevated pressure may be between 1500 psi to 3000 psi, and in certain examples may be between 1600 psi to 2800 psi. In certain aspects, the mixhead has a first orifice (not shown) with a diameter of, for example, 1.0 µm or less to receive the first polymeric component and a second orifice with a diameter of 1.0 µm or less to receive the second polymeric component.

The mixhead 106 may be in communication with a channel 108 and can supply the channel 108 with curable composition. The channel 108 can be configured to receive the curable composition from the mixhead 106 prior to the curable composition entering the coating mold cavity 104. The channel 108 can be configured with a secondary mixer 110 which can receive the curable composition. In certain aspects, the secondary mixer 110 increases the mixing efficiency and limits the introduction of improperly mixed curable composition into the coating mold cavity 104. For example, the secondary mixer 110 may induce turbulence into the flow of the curable composition to increase the mixing efficiency. Thus, in examples where the curable composition is an improperly mixed curable composition exiting the mixhead 106, the curable composition will be mixed by the secondary mixer 110 to form a properly mixed curable composition.

In certain aspects, the secondary mixer is a kinetic mixer. In certain aspects, the secondary mixer 110 is a static mixer such as a peanut mixer. The peanut mixer causes the curable composition to turn at relatively sharp angles (e.g., 90 degrees) thus inducing turbulence. For example, the peanut mixer causes a folding action within the curable composition. In certain aspects, the secondary mixer 110 is formed within the mold 102. The properly mixed curable composition exits the secondary mixer 110 and can enter a coating mold cavity 104.

As shown, the coating mold cavity 104 is positioned adjacent to or in contact with a substrate 116. The substrate may be, for example, a plastic substrate, a molded plastic substrate, a component, a metal substrate, and combinations thereof. A gap 122 can be formed between a surface 116a of the substrate 116 and a surface 104a of the coating mold cavity 104. The gap 122 has a shape which can receive curable composition from the channel 108. The curable composition can fill the gap 122 to form a curable coating which cures to form a coating 128 on the substrate 116. In certain aspects, the coating 128 has a cured thickness of 50 microns to 200 microns, and in other examples has a cured thickness of 80 microns to 100 microns. If an improperly mixed curable composition were to enter the gap 122, the coating 128 may exhibit a cosmetic and/or tacky defect.

Accordingly, the secondary mixer 110 can increase mixing efficiency such that substantially all of the curable composition that enters the gap 122 is properly mixed and the coating 128 is substantially free of cosmetic and/or tacky defects. As used herein "substantially free of defects" or "substantially free of a cosmetic and/or tacky defect" is meant to mean the exposed surface area of the coating is at least 50% free of defects, in other examples at least 70% free, in other examples at least 90% free, in other examples at least 98% free.

Figure 2:
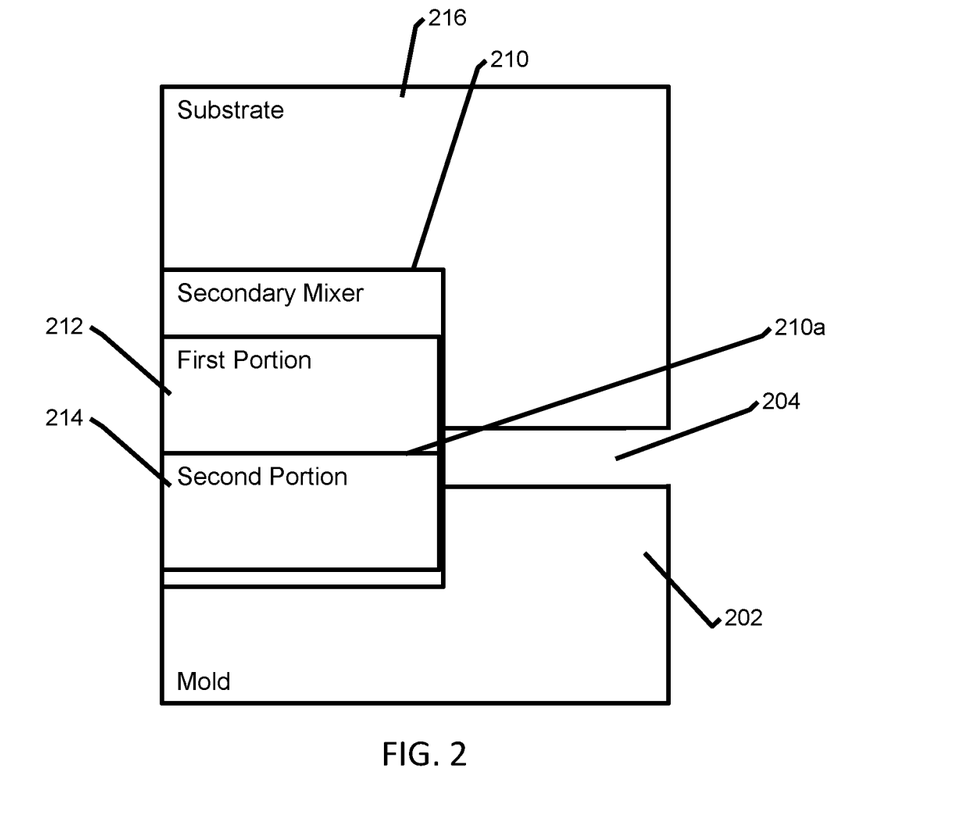
FIG. 2 depicts a detailed view of a secondary mixer that is partially formed in a substrate and a coating mold.

FIG. 2 illustrates a detailed view of an example of a mixing system comprising a secondary mixer 210 that is partially formed in a substrate 216 and partially formed in a mold 202. As shown, a first portion 212 (e.g., a quarter, a half, a side, etc.) of the secondary mixer 210 is formed in the substrate 216. In certain aspects, the first portion 212 is formed during a molding process of the substrate 216 in a substrate mold cavity (not shown). A complimentary second portion 214 of the secondary mixer 210 can be formed within the mold 202 (e.g., created within a metal mold). In certain aspects, the first and second portions, 212 and 214, respectively, form the secondary mixer 210 upon alignment with one another. For example, the substrate 216 can be positioned in alignment relative to the mold 202 such that the first portion 212 is aligned with the second portion 214. The first and second portions, 214 and 216, respectively, form a mixing cavity 210a of the secondary mixer 210 and the mixing cavity 210a can receive curable composition from a mixhead, such as, for example, mixhead 106, and direct the curable composition to a coating mold cavity 204 within the mold 202.

Creating the secondary mixer 210 from multiple bodies, for example, the first portion 212 and the second portion 214 can enable rapid replacement of at least a section of the secondary mixer 210. For example, the first portion 212 of the secondary mixer 210 can be removed with the substrate 216 after the curable composition fills the coating mold cavity 204. Thereafter, the secondary portion 212 can be physically separated from the substrate 216 and in certain aspects, disposed of. In certain aspects, the replacement of the section of the secondary mixer 210 can occur after each In-Mold coating process. In certain aspects, the second portion 214 may be re-used multiple times for different substrates (not shown). Accordingly, the secondary mixer 210 can be at least partially replaced after each In-Mold process.

The at least partial replacement of the secondary mixer 210 can enable rapid cleanout of curable composition from the secondary mixer 210 after each In-Mold coating process. For example, the curable composition can enter the secondary mixer 210 from a mixhead, such as, for example, mixhead 106. In certain aspects, the curable composition may be in an improperly mixed state prior to and/or upon entering the secondary mixer 210. The curable composition may be mixed by the secondary mixer 210 and exit the secondary mixer 210 in a properly mixed state. Thereafter, the curable composition can enter the coating mold cavity 204 and coat the substrate 216. However, in certain aspects, the curable composition may not completely void the secondary mixer upon a fill of the coating mold cavity 204 and there may be residual curable composition in the secondary mixer which can at least partially cure in the secondary mixer 210. The residual curable composition may create a cosmetic and/or tacky defect in a coating if the residual curable composition were to enter the coating mold cavity 204 and coat another substrate. Thus, the residual curable composition may need to be removed prior to another In-Mold coating process.

In certain aspects, the residual curable composition adheres to the first portion 212 of the secondary mixer 210 and the residual curable composition can be removed along with the substrate 216. In certain aspects, upon physically separating the secondary portion 212 from the substrate 216, the residual curable composition is removed from the substrate 210 to create a part substantially free of a cosmetic and/or tacky defect by, for example, a mechanical process. Accordingly, the secondary mixer 210 can comprise multiple bodies and can be replaced.

During a filling process of the coating mold cavity 104, a shot volume of curable composition can be introduced to the mixing system in order to coat the substrate 116. A portion of the shot volume (e.g., a coating volume) of curable composition can enter the coating mold cavity 104 and form the coating 128 on the substrate 116. Towards the end of the process of filling the coating mold cavity 104 with the coating volume, the pressure and velocity of the curable composition may decrease in the mixhead 106. At this stage, improperly mixed curable composition may form within the mixhead 106 within a select volume of the shot volume. If the select volume of improperly mixed coating enters the coating mold cavity 104, the coating 128 may have a cosmetic and/or tacky defect.

Figure 3:
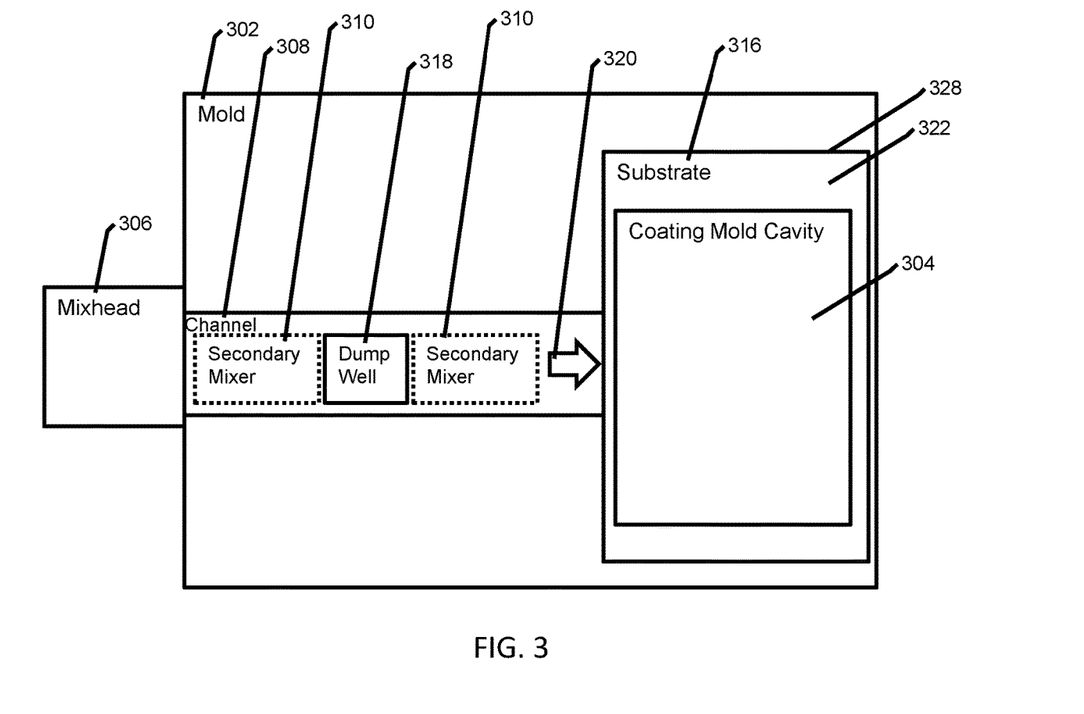
FIG. 3 depicts a mold with a dump well.

FIG. 3 illustrates a mixing system comprising a mold 302 with a dump well 318. As shown, the channel 308 is configured with the dump well 318 positioned between a mixhead 306 and a coating mold cavity 304. The dump well 318 receives curable composition from the mixhead 306 which passes through the dump well 318 and enters the coating mold cavity 304. Upon completion of the introduction of the shot volume of the curable composition into the mixing system, the coating mold cavity 304 contains the coating volume of the curable composition and the channel 308 contains a channel volume of the coating composition.

The dump well 318 is configured to adjust (e.g., increase) the channel volume of the channel 308. A dump volume of the dump well 318 can be configured to contain and/or capture the select volume of the improperly mixed curable composition and limit (e.g., prevent) the improperly mixed curable composition from entering the coating mold cavity 304. For example, the dump volume of the dump well 318 can be configured such that the channel volume is sized (e.g., can be large enough) to contain the select volume of improperly mixed curable composition and limit (e.g., prevent) the improperly mixed curable composition from reaching the coating mold cavity 304.

After the filling of the coating mold cavity 304, the channel 308 and dump well 318 may be purged (e.g., mechanically cleaned) prior to another In-Mold coating process. Thus, any curable composition within the channel 308 and dump well 318 (e.g., the channel volume) may not be a part of the product (e.g., coated substrate) and may be scrapped. In certain aspects, the dump well 318 can be sized to minimize the shot volume while containing the select volume in order to minimize scrapped material.

The dump well 318, can be configured in a variety of shapes such as, but not limited to, spherical, conical, rectangular, polygonal, or any other shape capable of containing and/or capturing the select volume of the curable composition. In certain aspects, the shape of the dump well 318 can be configured to enable a smooth transition in a flow path 320 of the curable composition from the channel 308 to the coating mold cavity 304. For example, the dump well 318 may be, an edge gate and a fan gate. The smooth transition limits air entrapments within the flow of the curable composition which can limit, and in certain aspects prevent, a cosmetic and/or defect in a cured coating on the substrate 316.

The dump well 318 may be positioned in a variety of locations. For example, as shown, the dump well 318 can be positioned between the mixhead 306 and the coating mold cavity 304. In certain aspects, which have the secondary mixer 310, the dump well 318 can be positioned in a flow path 320 of the curable composition between the mixhead 306 and a secondary mixer 310. In certain aspects, the dump well 318 can be positioned in the flow path 320 of the curable composition between the secondary mixer 310 and the coating mold cavity 304. In certain aspects, the dump well 318 may comprise a secondary mixer such as a peanut mixer. In certain aspects, the dump well 318 may comprise at least two channels.

The dump well 318 can increase mixing efficiency by lessening any pressure surges within the channel 308, mixhead 306, and/or coating mold cavity 304 due to back pressure. For example, the dump volume of the dump well 318 may absorb pressure changes (e.g., pressure surges) that occur in the coating mold cavity 304 (such as due to filling of the gap 322 with curable composition) and limit the effect the pressure changes may have on the pressure and/or velocity of the curable composition in the mixhead 306.

The dump volume of the dump well 318 may be based on the coating volume, the shot volume, and/or the substrate 316. In certain aspects, the dump volume is 33 percent of the coating volume. In certain aspects, the dump volume may be between 1 cubic centimeter and 100 cubic centimeters. The dump well 318 can be configured based on the size of the part and the mixing pressure, because the curable composition within the dump well 318 may be disposed of and/or recycled following the In-Mold coating process.

Figure 4:
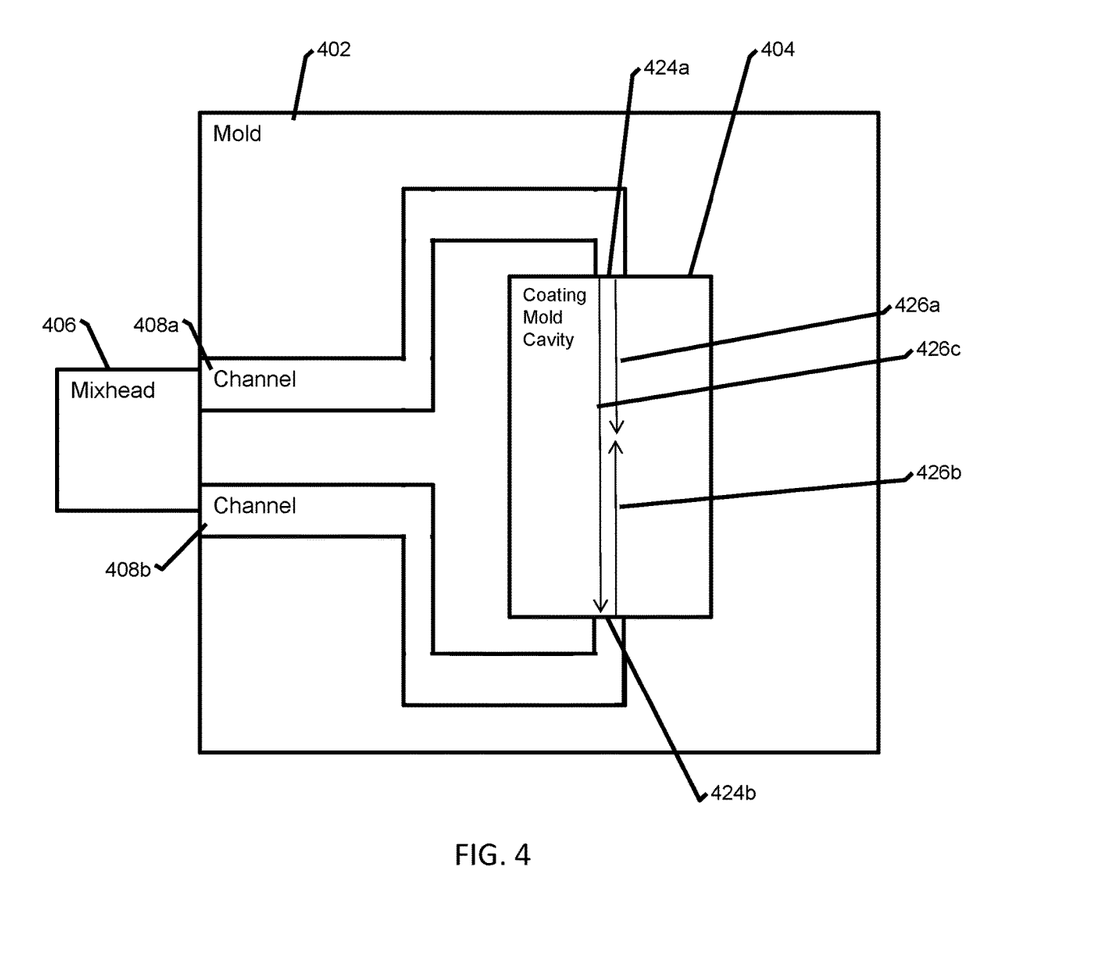
FIG. 4 depicts a mold with multiple channels.

FIG. 4 illustrates a mixing system comprising a mold 402 with multiple channels 408a and 408b. As shown, two or more channels (e.g., runners, sprues, etc.), including a first channel 408a and a second channel 408b, may be in communication with a mixhead 406 to direct the curable composition from the mixhead 406 to the coating mold cavity 404. The multiple channels 408a-408b enable the curable composition to enter the coating mold cavity 404 at different locations (e.g., different injection points). For example, the first channel 408a injects curable composition into the coating mold cavity 404 at a first point 424a and second channel 408b injects curable composition into the coating mold cavity 404 at a second point 424b. Accordingly, curable composition may be injected to multiple points of the coating mold cavity 404.

The multiple injections points 424a and 424b enable a reduction in a length that the curable composition has to flow from the respective injection point, 424a and 424b, to fill the coating mold cavity 404. For example, curable composition injected at the first point 424a has to travel a first length 426a and curable composition injected at the second point 424b has to travel a second length 426a. However, if the mold 402 was only provided with the first channel 408a, then curable composition injected at first point 424a would have to travel a third length 426c which is longer than the first length 426a and the second length 426b. Thus, utilizing multiple channels, 408a-408b, reduces the travel length of the curable composition in the coating mold cavity 404 which in turn reduces the back pressure generated within the coating mold cavity 404. The multiple channels 408a, 408b can allow the flow of curable composition to more effectively and expeditiously fill the mold cavity 404. In this manner, because the curable composition fills the mold cavity 404 more quickly at possibly reduced viscosity and back pressure, the mold cavity 404 may be filled more completely, thereby limiting the potential for a cosmetic and/or tacky defect in the coating. The reduction in back pressure limits pressure and/or velocity changes of the curable composition within the mixhead 406. Accordingly, utilizing multiple channels to fill the coating mold cavity 404 with curable composition may increase mixing efficiency within the mixhead 406.

The back pressure produced when filling a coating mold cavity may be reduced by using a lower flow rate (e.g., less than 8 grams per second of curable composition). Lowering the flow rate lowers the fill rate of the coating mold cavity which reduces the back pressure caused by filling the coating mold cavity with the curable composition. In certain aspects, the mixhead is configured to accommodate the lower flow rate and properly mix the curable composition. Accordingly, utilizing a lower flow rate and properly sizing the mixhead to accommodate the lower flow rate may increase mixing efficiency within the mixhead.

Figure 5A:
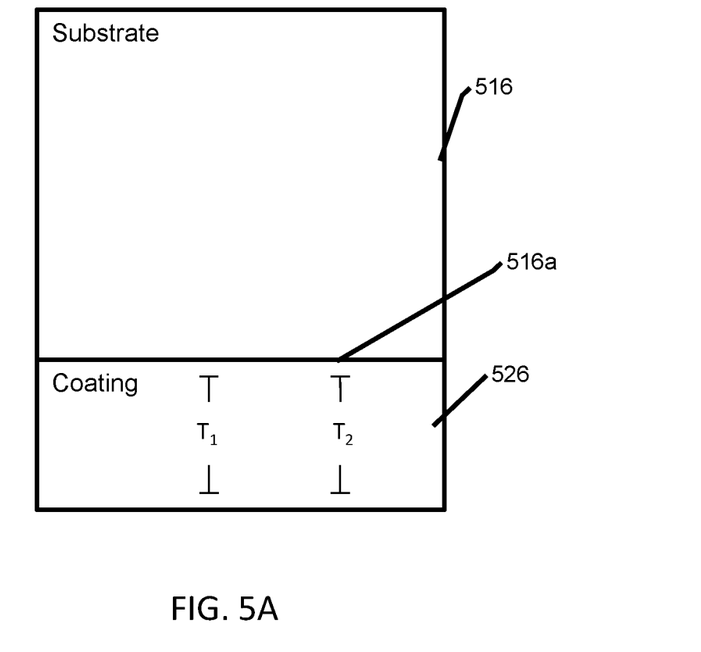
FIG. 5A depicts a first detailed view of a coated substrate.
Figure 5B:
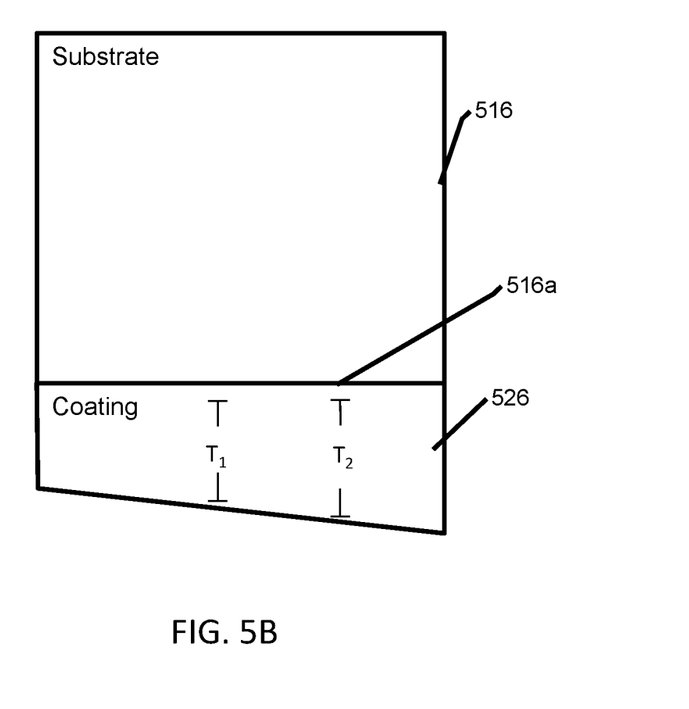
FIG. 5B depicts a second detailed view of a coated substrate.

Referring to FIG. 5A and FIG. 5B, a coating mold cavity 528 may be configured in a variety of designs, so that a coating 526 on a substrate 516 can be, if desired, as shown in FIG. 5A, the same thickness (e.g., $T_1=T_2$) along a length of a surface 516a of the substrate 516. In other examples, if desired, the coating mold cavity 528 may be shaped such that the coating 526 is as shown in FIG. 5B, of a different thickness (e.g., $T_1 \neq T_2$) along a length of the surface 516a of the substrate 516. In some cases, the coating mold cavity 528 may have a textured surface or may have a desired design or logo that is sought to be included in the coating 526. In certain aspects, the coating mold cavity 528 can be designed such that the dry film thickness (e.g., $T_1$ and/or $T_2$) of the coating 526 is 50 microns to 200 microns and in some examples 80 microns to 100 microns.

In certain aspects, an external release agent is present on the surface of one or both of the substrate and coating mold cavities. In certain aspects, a coating comprising, for example, electroless nickel and polytetrafluoroethylene (PTFE) may be used as an external release agent. Such a coating is commercially available under the tradename POLY-OND from Poly-Plating, Inc.

The coating mold cavity may be supplied with the curable composition at elevated pressure to form a curable coating on the substrate. The curable coating can be exposed to cure conditions of elevated temperature and external mold pressure (e.g., which maintains the elevated pressure within the coating mold cavity) to cure the curable coating. Suitable cure conditions include a mold temperature, for example, from 62° C. to 105° C., and in some examples may be 75° C. to 105° C. In certain aspects, the cure time, e.g., reaction time, is at least 10 seconds, and in some examples may be 10 to 90 seconds. In certain aspects, the cure time may be at least 70 seconds, and in other examples may be 70 to 120 seconds. In certain aspects, the cure time may be no more than 5 minutes. In another aspect, the cure time can be optimized to match the cure time of a molded plastic substrate. In certain aspects, prior to opening the mold or responsive to opening the mold, the pressure in the coating mold cavity may decrease to ambient pressure (e.g., 1 atmosphere) from the elevated pressure.

As used herein, "external mold pressure" means the externally applied pressure applied against the opposing faces of the mold (in which the coating mold cavity is disposed) when the opposing faces of the mold are forced together. The source of such pressure can be clamps, rams, or another device. The tonnage of the external mold pressure should be sufficient to prevent coating flash. The external mold pressure, in certain aspects, is maintained relatively constant through the coating cure process.

The In-Mold process may also be carried out in a mold having more than the two cavities. The cavities can be used to apply multiple coatings in succession. For example, a first coating may be applied in a first cavity, a second coating may be applied in second cavity, etc. until the desired number of coatings are applied. In certain aspects, one applied coating can have specific properties different from one or more other coatings. In another aspect, several molded plastic substrates can be produced in parallel, each in one first cavity and then each coated in parallel in one second cavity.

Properly configuring a mold with the features described above (e.g., the secondary mixer, dump well, and/or multiple channels), can provide a substantially mixed curable composition to coat a substrate with curable coating such that when the coating mold cavity is opened, the cured coating is substantially free of a cosmetic and/or tacky defect and, in certain aspects, has a dry coating thickness of 50 microns to 200 microns and in some examples is 80 microns to 100 microns.

An injection molding device can aid production of the substrate from a thermoplastic or thermosetting plastic utilizing a injection molding process. Suitable injection molding devices are known to the person skilled in the art. They include a standard injection molding machine construction comprising a plasticating unit (e.g., a heater, a screw, etc.) for processing of the plastic and a closing unit (e.g., clamping unit), which is responsible for the travelling, opening and closing movement of a substrate mold.

A coating injection device can aid in the production of the coating on the substrate. The coating injection device can be connected to the channel in order to fill the coating mold cavity with curable composition and coat the substrate. Suitable coating injection devices can include one or more reservoir containers for the polymeric components, stirrers, feed pumps, temperature control devices, feed lines and a mixing device (e.g. a mixhead).

The coated substrates may be used to form various industrial and commercial products and are suitable, for example, as automobile interior components, such as e.g. pillar lining, trim, glove compartment covers, coverings, light shades, instrument panels, components of the air delivery system. In addition, the coated substrates may be employed for industrially produced components of plastic, such as, for example, housings of electrical equipment, computer devices, mobile telephones, medical devices, and household articles.

In certain aspects, a 100 micron coating thickness obtained a 60-70 percent yield of parts substantially free of a cosmetic and/or tacky defect. In certain aspects, a 200 micro part obtained a 95 percent yield of parts substantially free of a cosmetic and/or tacky defect.

ASPECTS OF THE INVENTION

Aspects of the invention include, but are not limited to, the following numbered clauses.

1. A process for In-Mold coating, comprising introducing a curable composition to a mixhead at a first elevated pressure, the curable composition comprising a first polymeric component and a second polymeric component, the introducing of the curable composition to the mixhead comprising mixing the first and second polymeric components by impingement to form an intermediate composition, introducing the intermediate composition to a secondary mixer, the introducing of the intermediate composition to the secondary mixer comprising mixing the intermediate composition to form a coating composition, and introducing the coating composition into a mold containing a substrate to form a curable coating on a surface of the substrate.

2. The process of clause 1, wherein the secondary mixer is a peanut mixer, wherein the mixing of the intermediate composition to form the coating composition is a kinetic mixing.

3. The process of one of clauses 1 and 2, wherein the secondary mixer is partially formed in the mold and partially formed in the substrate.

4. The process of any one of clauses 1 to 3, wherein introducing the coating composition into the mold containing the substrate further comprises introducing at least one of the intermediate composition and the coating composition into a dump well in communication with the mold, and further comprising limiting a flow of the curable composition wherein the introducing of the curable composition to the mixhead is decreased to a second pressure less than the first elevated pressure to form a non-homogenous mixture of the first and second polymeric components, and limiting entry of the non-homogenous mixture into the mold by a volume of the dump well.

5. The process of clause 4, wherein the dump well comprises the secondary mixer.

6. The process of one of clauses 4 and 5, wherein the dump well comprises at least two channels.

7. The process of any one of clauses 4 to 6, further comprising positioning the dump well between the mixhead and the secondary mixer.

8. The process of any one of clauses 4 to 6, further comprising positioning the secondary mixer between the dump well and the mixhead.

9. A process for In-Mold coating comprising introducing a curable composition to a mixhead at a first elevated pressure, the curable composition comprising a first polymeric component and a second polymeric component, the introducing of the curable composition to the mixhead comprising mixing the first and second polymeric components by impingement to form a coating composition, introducing the coating composition into a mold containing a substrate via a dump well to form a curable coating on a surface of the substrate, responsive to the introducing of the coating composition into the mold, limiting a flow of the curable composition wherein the introducing of the curable composition to the mixhead is decreased to a second pressure less than the first elevated pressure to form a non-homogenous mixture, and limiting entry of the non-homogenous mixture into the mold by a volume of the dump well.

10. A process for In-Mold coating comprising introducing a curable composition to a mixhead at a first elevated pressure, the curable composition comprising a first polymeric component and a second polymeric component, the introducing of the curable composition to the mixhead comprising mixing the first and second polymeric components by impingement to form a coating composition, and introducing the coating composition into a mold containing a substrate via at least two channels to form a curable coating on a surface of the substrate.

11. The process of any one of clauses 1 to 10, where the first polymeric component comprises an isocyanate-reactive group and the second polymeric component comprises a polyisocyanate.

12. The process of clause 11, wherein the isocyanate-reactive group comprises a polyol.

13. The process of any one of clauses 1 to 12, wherein the first elevated pressure is at least 1600 psi.

14. The process of any one of clauses 1 to 13, wherein the coating composition is homogeneous.

15. The process of any one of clauses 1 to 14, further comprising curing the curable coating to form a cured coating on the substrate, the cured coating having a thickness between 50 micrometers and 100 micrometers.

16. The process of clause 15, wherein the cured coating thickness is between 80 micrometers and 100 micrometers.

17. The process of one of clauses 15 and 16, wherein the cured coating is substantially free of defects.

18. The process of any one of clauses 15 to 17, wherein the curable coating composition is cured at a mold temperature of 75° C. to 105° C., and for a period between 10 and 90 seconds.

19. The process of any one of clauses 1 to 18, further comprising introducing the coating composition into the mold via at least two channels.

20. A system comprising a mixhead in communication with a first body, the mixhead configured to receive a curable composition at a first elevated pressure, the curable composition comprising a first polymeric component and a second polymeric component, the mixhead configured to mix the first and second polymeric components by impingement to form an intermediate composition, a secondary mixer positioned between the mixhead and a cavity positioned in the first body, the secondary mixer configured to receive the intermediate composition and to mix the intermediate composition to form a coating composition, and the cavity configured to receive a substrate, to receive the coating composition, and to form a curable coating on a surface of the substrate from the coating composition.

21. The system of clause 20, wherein the secondary mixer is a peanut mixer, wherein the mix of the intermediate composition to form the coating composition is a kinetic mix.

22. The system of one of clauses 20 and 21, wherein the secondary mixer is partially formed in a mold and partially formed in the substrate.

23. The system of any one of clauses 20 to 22, further comprising responsive to receipt of the coating composition by the cavity, the mixhead configured to receive the curable composition at a second pressure less than the first elevated pressure to form a non-homogenous mixture, and a dump well positioned between the mixhead and the cavity, the dump well having a volume sized to limit entry of the non-homogenous mixture into the cavity.

24. The system of clause 23, wherein the dump well comprises the secondary mixer.

25. The system of one of clauses 23 and 24, wherein the dump well comprises at least two channels.

26. The system of any one of clauses 23 to 25, further comprising the dump well positioned between the mixhead and the secondary mixer.

27. The system of any one of clauses 23 to 25, further comprising the secondary mixer positioned between the dump well and the mixhead.

28. A system comprising a mixhead in communication with a first body, the mixhead configured to receive a curable composition at a first elevated pressure, the curable composition comprising a first polymeric component and a second polymeric component, the mixhead configured to mix the first and second polymeric components by impingement to form a coating composition, a cavity positioned in the first body, the cavity configured to receive a substrate, to receive the coating composition, and to form a curable coating on a surface of the substrate from the coating composition, responsive to receipt of the coating composition by the cavity, the mixhead configured to receive the curable composition at a second pressure less than the first elevated pressure to form a non-homogenous mixture, and a dump well positioned between the mixhead and the cavity, the dump well having a volume sized to limit entry of the non-homogenous mixture into the mold.

29. A system comprising a mixhead in communication with a first body, the mixhead configured to receive a curable composition at a first elevated pressure, the curable composition comprising a first polymeric component and a second polymeric component, the mixhead configured to mix the first and second polymeric components by impingement to form a coating composition, a cavity positioned in the first body, the cavity configured to receive a substrate, to receive the coating composition, and to form a curable coating on a surface of the substrate from the coating composition, and at least two channels positioned between the mixhead and the cavity, the at least two channels configured to facilitate conveyance of the coating composition to the cavity.

30. The system of any one of clauses 20 to 29, where the first polymeric component comprises an isocyanate-reactive group and the second polymeric component comprises a polyisocyanate.

31. The system of clause 30, wherein the isocyanate-reactive group comprises a polyol.

32. The system of any one of clauses 20 to 31, wherein the first elevated pressure is at least 1600 psi.

33. The system of any one of clauses 20 to 32, wherein the coating composition is homogeneous.

34. The system of any one of clauses 20 to 33, further comprising the curable coating configured to form a cured coating on the substrate having a thickness between 50 micrometers and 100 micrometers.

35. The system of clause 34, wherein the cured coating thickness is between 80 micrometers and 100 micrometers.

36. The system of one of clauses 34 and 35, wherein the cured coating is substantially free of defects.

37. The system of any one of clauses 34 to 36, wherein the curable coating composition is cured at a mold temperature of 75° C. to 105° C.; and for a period between 10 and 90 seconds.

38. The system of any one of clauses 20 to 37, further comprising at least two channels positioned between the mixhead and the cavity, the at least two channels configured to facilitate conveyance of the coating composition to the cavity.

39. A molded article comprising a first body comprising a substrate, a molded coating in contact with a surface of the substrate, the coating comprising a polymeric composition, the coating having a thickness between 50 micrometers and 100 micrometers.

40. The molded article of clause 39, wherein the coating thickness is between 80 micrometers and 100 micrometers.

41. The molded article of one of clauses 39 and 40, wherein the coating comprises polyurethane.

42. The molded article of any one of clauses 39 to 41, wherein the molded article is at least one of an automotive part and a housing of electrical equipment.

43. A product formed by an In-Mold coating process, the process comprising introducing a curable composition to a mixhead at a first elevated pressure, the curable composition comprising a first polymeric component and a second polymeric component, the introducing of the curable composition to the mixhead comprising mixing the first and second polymeric components by impingement to form an intermediate composition, introducing the intermediate composition to a secondary mixer, the introducing of the intermediate composition to the secondary mixer comprising mixing the intermediate component to form a coating composition, and introducing the coating composition into a mold containing a substrate to form a curable coating on a surface of the substrate.

44. A product formed by an In-Mold coating process, the process comprising introducing a curable composition to a mixhead at a first elevated pressure, the curable composition comprising a first polymeric component and a second polymeric component, the introducing of the curable composition to the mixhead comprising mixing the first and second polymeric components by impingement to form a coating composition, introducing the coating composition into a mold containing a substrate via a dump well to form a curable coating on a surface of the substrate, responsive to the introducing of the coating composition into the mold, limiting a flow of the curable composition, wherein the introducing of the curable composition to the mixhead is decreased to a second pressure less than the first elevated pressure to form a non-homogenous mixture, and limiting entry of the non-homogenous mixture into the mold by a volume of the dump well.

45. A product formed by an In-Mold coating process, the process comprising introducing a curable composition to a mixhead at a first elevated pressure, the curable composition comprising a first polymeric component and a second polymeric component, the introducing of the curable composition to the mixhead comprising mixing the first and second polymeric components by impingement to form a coating composition, and introducing the coating composition into a mold containing a substrate via at least two channels to form a curable coating on a surface of the substrate.

46. A process for In-Mold coating, comprising introducing a curable composition to a mixhead at a first elevated pressure, the curable composition comprising a first polymeric component and a second polymeric component, the introducing of the curable composition to the mixhead comprising mixing the first and second polymeric components by impingement to form a coating composition, and introducing the coating composition into a mold containing a substrate via a secondary cavity to form a curable coating on a surface of the substrate, the secondary cavity comprises at least one element selected from the group consisting of: a secondary mixer, a dump well, and at least two channels.

This specification has been written with reference to various non-limiting and non-exhaustive aspects. However, it will be recognized by persons having ordinary skill in the art that various substitutions, modifications, or combinations of any of the disclosed aspects (or portions thereof) may be made within the scope of this specification. Thus, it is contemplated and understood that this specification supports additional aspects not expressly set forth herein. Such aspects may be obtained, for example, by combining, modifying, or reorganizing any of the disclosed steps, components, elements, features, aspects, characteristics, limitations, and the like, of the various non-limiting aspects described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A system comprising:
a mixhead in communication with a first body, the mixhead configured to receive a curable composition at a first elevated pressure, the curable composition comprising a first polymeric component and a second polymeric component, the mixhead configured to mix the first and second polymeric components by impingement to form an intermediate composition;
a channel comprising a secondary mixer and a dump well, and having a channel volume;
the secondary mixer positioned between the mixhead and a cavity positioned in the first body, the secondary mixer configured to receive the intermediate composition and to mix the intermediate composition to form a coating composition; and
the cavity configured to receive a substrate, to receive the coating composition, and to form a curable coating on a surface of the substrate from the coating composition,
wherein the dump well is configured to increase the channel volume and to limit improperly mixed curable composition from reaching the cavity.

2. The system according to claim 1, wherein the secondary mixer is a peanut mixer, wherein the mix of the intermediate composition to form the coating composition is a kinetic mix.

3. The system according to claim 1, wherein the secondary mixer is partially formed in a mold and partially formed in the substrate.

4. The system according to claim 1,
wherein the mixhead is configured to receive the curable composition at a second pressure less than the first elevated pressure to form a non-homogenous mixture.

5. The system according to claim 4, wherein the dump well comprises the secondary mixer.

6. The system according to claim 4, wherein the dump well comprises at least two channels.

7. The system according to claim 4, wherein the dump well is positioned between the mixhead and the secondary mixer.

8. The system according to claim 4, wherein the secondary mixer is positioned between the dump well and the mixhead.

9. The system according to claim 1, where the first polymeric component comprises an isocyanate-reactive group and the second polymeric component comprises a polyisocyanate.

10. The system according to claim 9, wherein the isocyanate-reactive group comprises a polyol.

11. The system according to claim 1, wherein the first elevated pressure is at least 1600 psi.

12. The system according to claim 1, wherein the coating composition is homogeneous.

13. The system according to claim 1, further comprising the curable coating configured to form a cured coating on the substrate having a thickness between 50 micrometers and 100 micrometers.

14. The system according to claim 13, wherein the cured coating thickness is between 80 micrometers and 100 micrometers.

15. The system according to claim 13, wherein the cured coating is substantially free of defects.

16. The system according to claim 13, wherein the curable coating composition is cured:
at a mold temperature of 75° C. to 105° C.; and
for a period between 10 and 90 seconds.

17. The system according to claim 1, further comprising:
at least two channels positioned between the mixhead and the cavity, the at least two channels configured to facilitate conveyance of the coating composition to the cavity.

* * * * *